US012384167B2

(12) United States Patent
Beppu et al.

(10) Patent No.: US 12,384,167 B2
(45) Date of Patent: Aug. 12, 2025

(54) RECORDING DEVICE

(71) Applicant: SEIKO EPSON CORPORATION, Tokyo (JP)

(72) Inventors: Yukiya Beppu, Matsumoto (JP); Nobuaki Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/522,580

(22) Filed: Nov. 29, 2023

(65) Prior Publication Data

US 2024/0181789 A1 Jun. 6, 2024

(30) Foreign Application Priority Data

Dec. 2, 2022 (JP) ................................ 2022-193315

(51) Int. Cl.
*B41J 2/335* (2006.01)

(52) U.S. Cl.
CPC ......... *B41J 2/33535* (2013.01); *B41J 2/3352* (2013.01); *B41J 2/3355* (2013.01)

(58) Field of Classification Search
CPC ..... B41J 2/33535; B41J 2/3352; B41J 2/3355
See application file for complete search history.

(56) References Cited

U.S. PATENT DOCUMENTS

2010/0157543 A1* 6/2010 Shohet ................. G01D 11/245 29/428
2019/0232648 A1* 8/2019 Hiramatsu ........... B41J 2/04561
2022/0203720 A1* 6/2022 Kobayashi ............... B41J 11/42

FOREIGN PATENT DOCUMENTS

JP 2008-049526 A 3/2008

* cited by examiner

*Primary Examiner* — Yaovi M Ameh
(74) *Attorney, Agent, or Firm* — WORKMAN NYDEGGER

(57) ABSTRACT

A recording device includes a recording section configured to perform recording on a medium; a control substrate 60 configured to be involved in the operation of the recording section; and a storage section including a metal partition 70 and covering the control substrate 60, wherein the control substrate 60 is in contact with the convex member 72 constitutes at least a part of the partition 70 via the elastic member 80 having heat conductivity.

4 Claims, 10 Drawing Sheets

RECORDING DEVICE

The present application is based on, and claims priority from JP Application Serial Number 2022-193315, filed Dec. 2, 2022, the disclosure of which is hereby incorporated by reference herein in its entirety.

BACKGROUND

1. Technical Field

The present disclosure relates to a recording device for performing recording on a medium.

2. Related Art

In recent years, in a recording device such as an image forming device, there has been a demand for effective cooling of a circuit substrate that becomes high in temperature as the device operates. JP-A-2008-49526 describes an image forming device provided with a blower fan for cooling the inside of a box covering a circuit substrate.

However, in a recording device, such as a recording device for recording on a medium such as a fabric, that is often used in an environment in which a mist of a pretreatment agent is applied to the medium before recording, or in which fluff generated from the medium and the like floats, there is a concern that the floating matter may adhere to the circuit substrate when the air around the circuit substrate is blown, and cause a malfunction or failure of the device.

SUMMARY

A recording device includes a recording section configured to perform recording on a medium; a circuit substrate configured to be involved in the operation of the recording section; and a storage section including a metal partition and covering the circuit substrate, wherein the circuit substrate is in contact with a heat transfer section constituting at least a part of the partition via an elastic member having heat conductivity.

DESCRIPTION OF EMBODIMENTS

A recording device 1 of the present embodiment will be described below with reference to the drawings. The recording device 1 of the present embodiment is, for example, an inkjet type printer that records images such as characters or photographs onto a medium by ejecting ink, which is an example of liquid onto the medium, which is a recording target. The material of the medium is not limited to paper, and various materials such as textile, such as cloth and fabric, and vinyl chloride resin are assumed.

In each of the drawings, an X-axis, a Y-axis, and a Z-axis intersecting with each other are shown. Typically, the X-axis, Y-axis, and Z-axis are orthogonal to each other. The X-axis is parallel to an installation surface of the recording device 1 and corresponds to the width direction of the recording device 1. The Y-axis is parallel to the installation surface of the recording device 1 and corresponds to the depth direction of the recording device 1. The Z-axis is perpendicular to the installation surface of the recording device 1 and corresponds to the height direction of the recording device 1.

Hereinafter, a +Y direction parallel to the Y-axis is a direction from the rear surface to the front surface of the recording device 1, and a −Y direction parallel to the Y-axis is a direction opposite to the +Y direction. A +X direction parallel to the X-axis is a direction toward the left when facing the front surface of the recording device 1, and a −X direction parallel to the X-axis is a direction opposite to the +X direction. A +Z direction parallel to the Z-axis is a direction toward the upper side, and a −Z direction parallel to the Z-axis is a direction opposite to the +Z direction.

Figure 1:
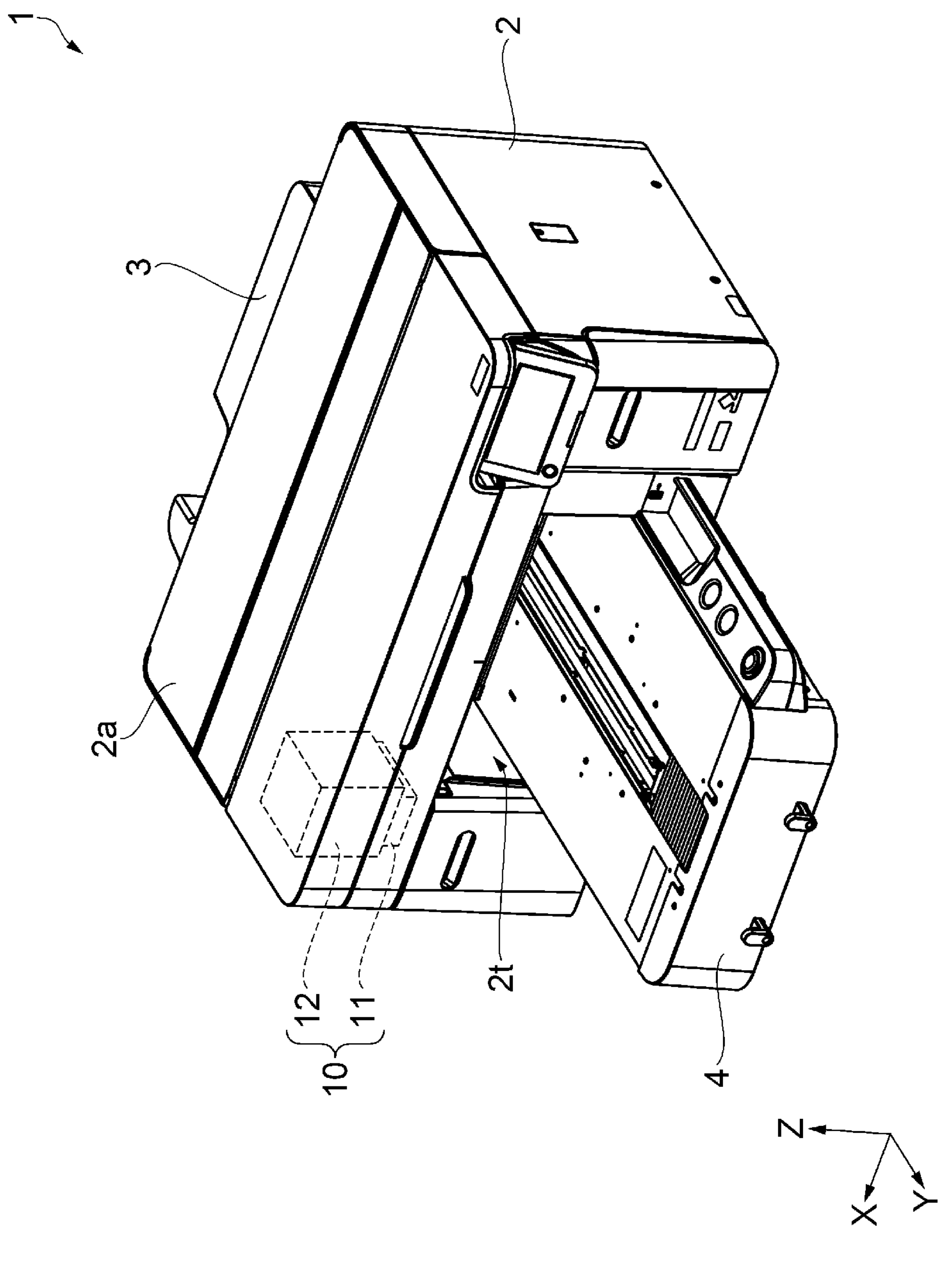
FIG. 1 is a perspective view showing a front side of a recording device.
Figure 2:
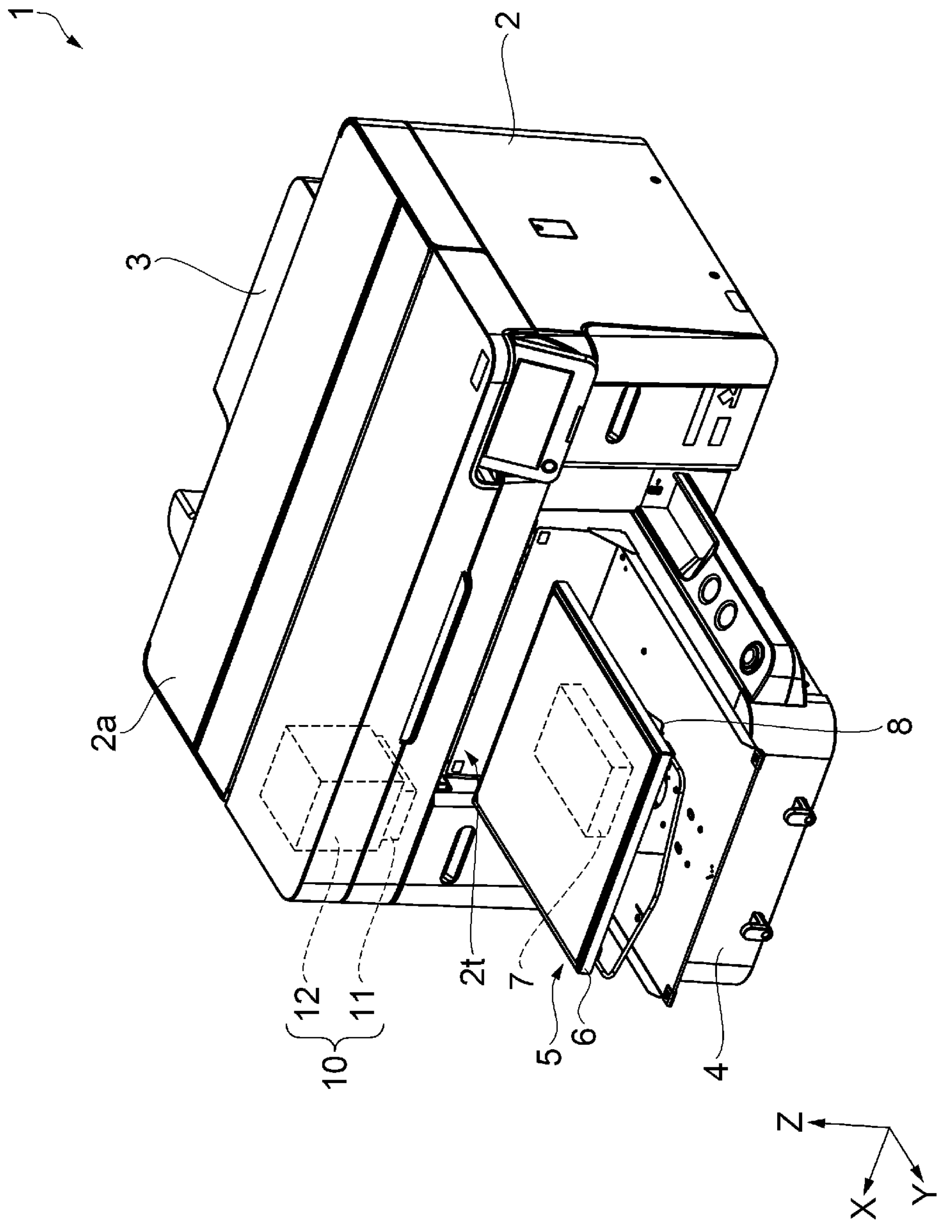
FIG. 2 is a perspective view showing the front side of the recording device.
Figure 3:
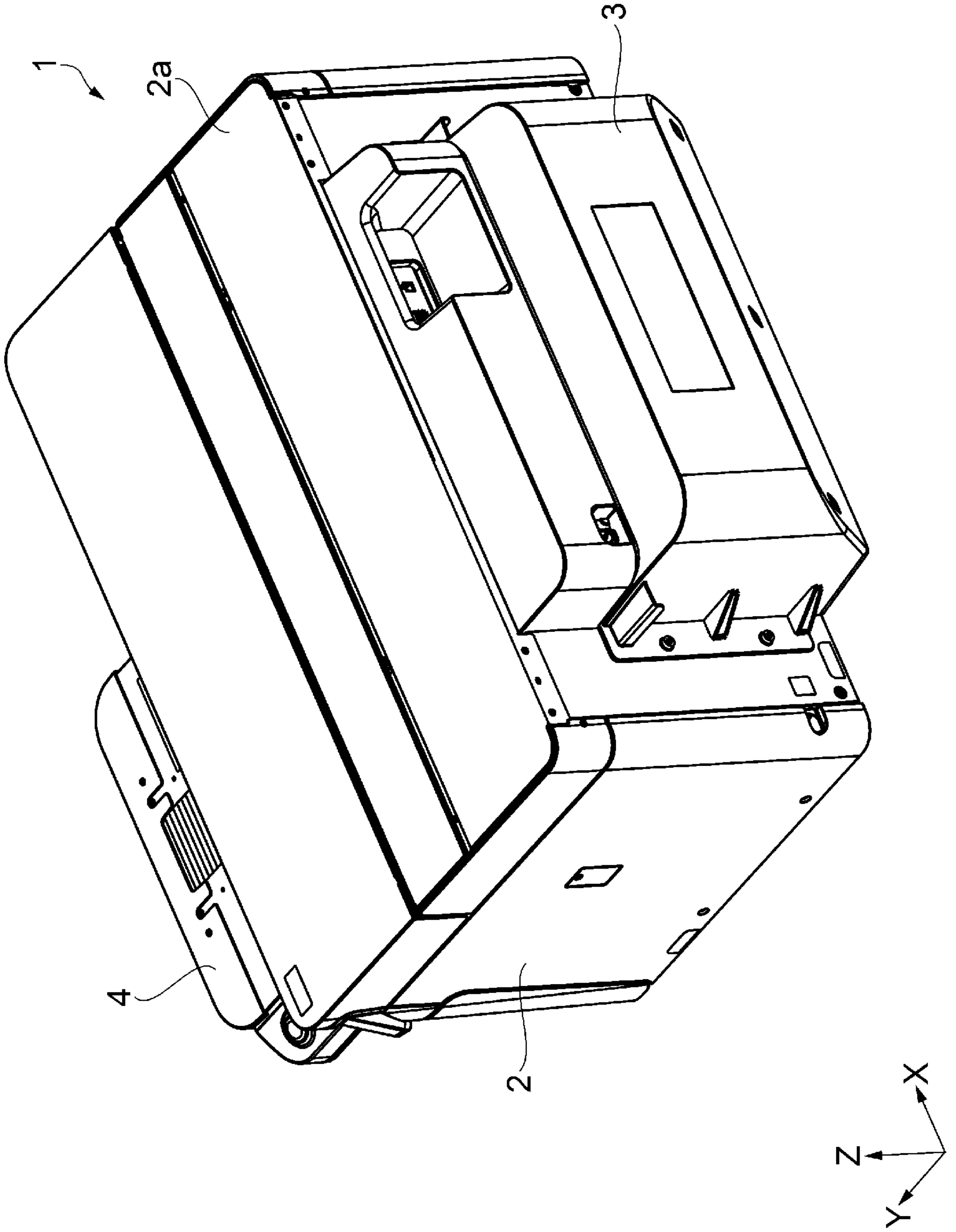
FIG. 3 is a perspective view showing a rear side of the recording device.
Figure 4:
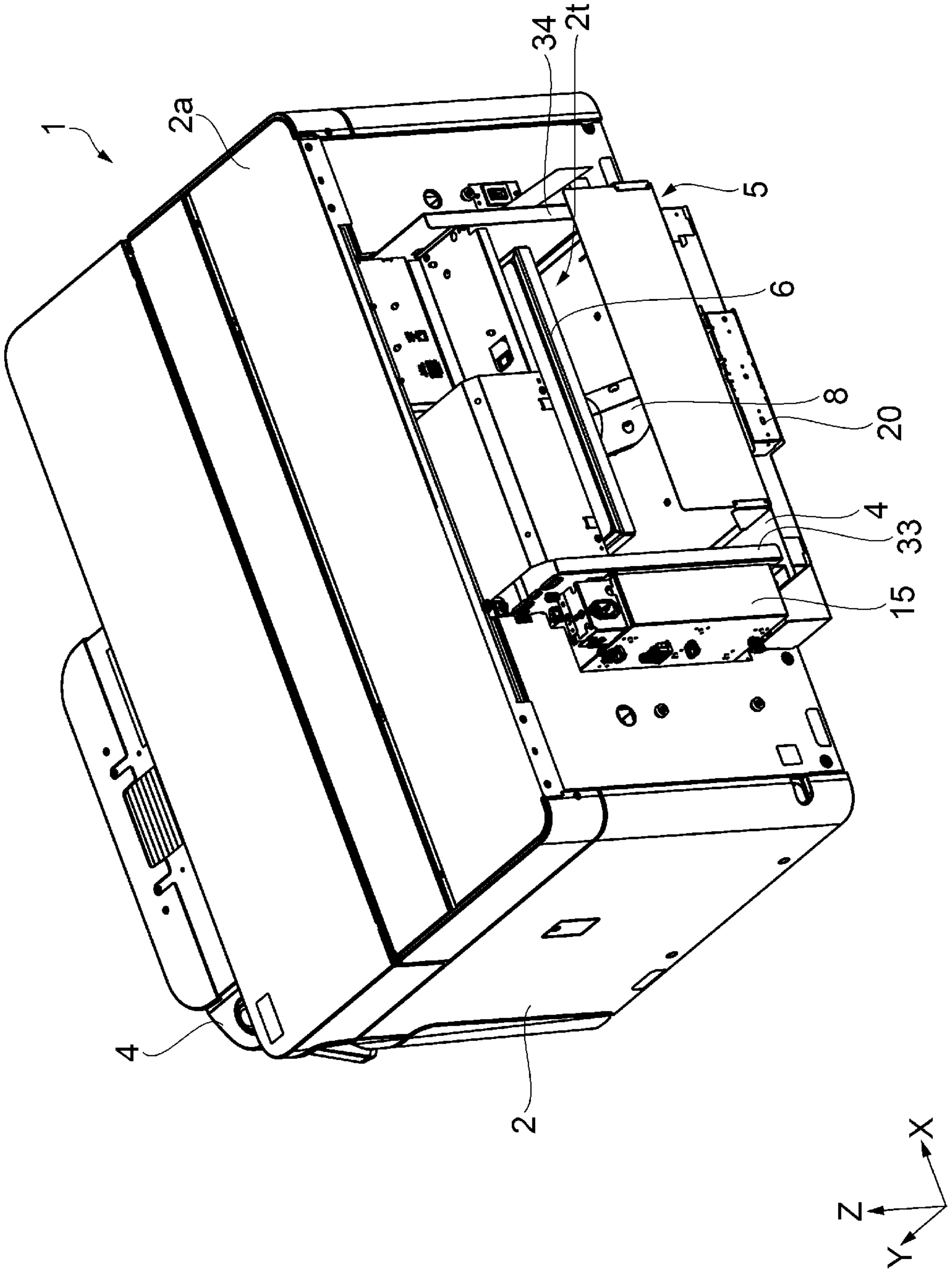
FIG. 4 is a perspective view showing the rear side of the recording device.

FIGS. 1 and 2 are perspective views showing a front side of the recording device 1 of the embodiment, FIG. 1 is a view showing a state in which a medium support section 5 (to be described later) is positioned inside a housing 2, and FIG. 2 is a view showing a state in which the medium support section 5 is positioned outside the housing 2. Further, FIGS. 3 and 4 are perspective views showing a rear surface side of the recording device 1, FIG. 3 is a view showing a state in which a rear cover 3 (to be described later) is mounted, and FIG. 4 is a view showing a state in which the rear cover 3 is removed.

As shown in FIGS. 1 to 4, the recording device 1 includes the housing 2, which accommodates a device main body. The housing 2 is provided with a through hole 2*t* that penetrates from the front surface to the rear surface, and a medium movement section 4, whose longitudinal direction is the ±Y direction, is disposed so as to protrude from the through hole 2*t* in the +Y direction and the −Y direction. The medium movement section 4 supports a medium supporting section 5 supporting the medium to be movable in the ±Y direction. Then, the medium movement section 4 moves the medium supporting section 5 in the ±Y direction between the inside and the outside of the housing 2 by the drive of a drive mechanism (not shown). The medium movement section 4 corresponds to a movement section. On the rear side of the housing 2, the through hole 2*t* is covered with a box-shaped rear cover 3.

The medium support section 5 includes a tray 6 for supporting the medium, a stage 7 serving as a support base for supporting the tray 6, and a base section 8 for supporting the stage 7. The stage 7 and the tray 6 are movable in the vertical direction, that is, in the ±Z direction, with respect to the base section 8 by an elevating mechanism (not shown). That is, the position of the medium in the height direction can be adjusted by the elevating mechanism. The ±Z direction, which is the movement direction of the stage 7, may be a direction slightly inclined from the vertical direction. Further, in the recording device 1, the stage 7 is configured to support the medium via the tray 6, but the stage 7 may be configured to directly support the medium.

A recording section 10 constituting the device main body is disposed inside the housing 2. The recording section 10 includes a recording head 11 that ejects ink to perform recording on the medium, a carriage 12 that holds the recording head 11, and a drive mechanism (not shown) that moves the carriage 12 in the ±X direction. Then, the recording device 1 ejects ink from the recording head 11 toward the medium supported by the tray 6 while reciprocating the carriage 12 in the ±X direction. Since the housing 2 is configured to cover the entire movement range of the carriage 12, the housing 2 has a shape elongated in the ±X direction.

The medium is set on the tray 6 while the medium support section 5 is positioned further in the +Y direction than is the through hole 2*t* of the housing 2, that is, while the medium support section 5 is positioned outside the housing 2 (see FIG. 2). After the medium is set on the tray 6, the medium support section 5 is transported by the medium movement section 4 to inside the housing 2, that is, to inside the through hole 2*t* (see FIG. 1), and is moved to a recording start position positioned at the −Y direction end section of the medium movement section 4. Then, the recording device 1 records an image in a wide range of the medium by alternately repeating an operation of ejecting ink from the recording head 11 while moving the carriage 12 in the ±X direction and an operation of moving the medium support section 5 in the +Y direction by a predetermined amount.

As shown in FIG. 4, a power supply box 15 is disposed on the rear side of the recording device 1. The power supply box 15 generates power necessary for operating the recording device 1 and supplies power to each section of the recording device 1.

As shown in FIG. 4, a base frame 20 for supporting the entire recording device 1 is disposed at the bottom section of the recording device 1.

Figure 5:
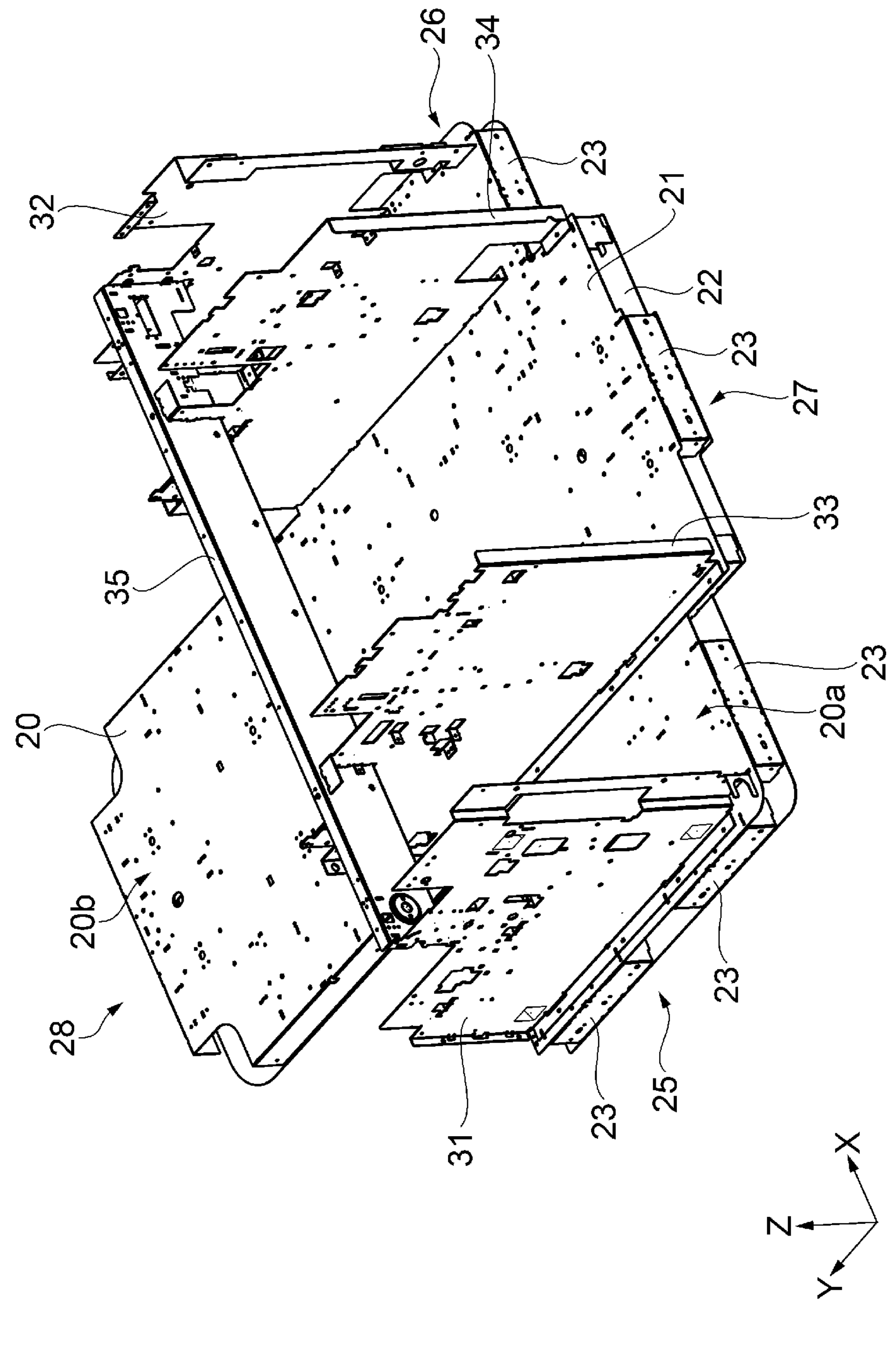
FIG. 5 is a perspective view showing a frame structure of the recording device.

FIG. 5 is a perspective view showing a frame structure of the recording device 1.

As shown in FIG. 5, the base frame 20 is a flat-plate-shaped member as a whole and is disposed along an XY plane. That is, the base frame 20 is arranged along the ±X direction and the ±Y direction. Since the base frame 20 supports the device main body accommodated in the housing 2, which is elongated in the ±X direction, and supports the medium movement section 4, which is elongated in the ±Y direction, the base frame 20 has a substantially cross-shape as viewed from the ±Z direction. Specifically, the base frame 20 includes a first support section 20*a* extending in the ±X direction and a second support section 20*b* extending in the ±Y direction to intersect with the first support section 20*a*. The first support section 20*a* mainly supports the device main body covered by the housing 2, and the second support section 20*b* mainly supports the medium movement section 4. The base frame 20 must have strength that can withstand the weight of the recording device 1, and must have high-precision flatness because the base frame 20 serves as a reference for the movement operation of the medium support section 5 and of the carriage 12.

An end section 25 of the base frame 20 in the −X direction, that is, the −X direction end section 25 of the first support section 20*a* extends in the ±Y direction. Similarly, an end section 26 of the base frame 20 in the +X direction, that is, the +X direction end section 26 of the first support section 20*a*, also extends in the ±Y direction. In addition, an end section 27 of the base frame 20 in the −Y direction, that is, the −Y direction end section 27 of the second support section 20*b*, extends in the ±X direction as a whole while including indentations and protrusion. Similarly, an end section 28 of the base frame 20 in the +Y direction, that is, the +Y direction end section 28 of the second support section 20*b*, also extends in the ±X direction as a whole while including indentations and protrusion.

The base frame 20 is formed by a top surface member 21 made of a substantially cross-shaped plate material, a bottom surface member 22 made of a substantially cross-shaped plate material and arranged parallel to the top surface member 21, and a plurality of reinforcement members 23. The reinforcement members 23 are members formed by bending a plate material and are disposed between the top surface member 21 and the bottom surface member 22. The reinforcement members 23 are arranged more densely at a position where strength and flatness are required. Each of the top surface member 21, the bottom surface member 22, and the reinforcement members 23 is formed of a plate material made of steel, that is, a steel plate. As the steel plate, for example, a galvanized steel plate or the like is used. The base frame 20 is formed by joining the top surface member 21 and the reinforcement members 23 and the bottom surface member 22 and the reinforcement members 23 by welding.

A plurality of frame members are arranged on the base frame 20. Specifically, a first side frame 31, a second side frame 32, a first middle frame 33, a second middle frame 34, and a main frame 35 are disposed on the base frame 20. Each of these frames is formed of steel plate similarly to each of the members constituting the base frame 20.

The first side frame 31, the second side frame 32, the first middle frame 33, and the second middle frame 34 are flat-plate-shaped members along a YZ plane, and specifically, are parallel to the YZ plane. That is, the first side frame 31, the second side frame 32, the first middle frame 33, and the second middle frame 34 are arranged along the ±Y direction in a posture intersecting with the base frame 20. The first side frame 31, the second side frame 32, the first middle frame 33, and the second middle frame 34 are fixed to the base frame 20 by screws or the like, and are supported by the base frame 20.

The first side frame 31, the second side frame 32, the first middle frame 33 and the second middle frame 34 are spaced from each other and arranged side by side in the ±X direction. Specifically, the first side frame 31 is disposed along the −X direction end section 25 of the base frame 20, and the second side frame 32 is disposed along the +X direction end section 26 of the base frame 20. The first middle frame 33 is disposed along a −X direction end section of the second support section 20*b* of the base frame 20 and the second middle frame 34 is disposed along a +X direction end section of the second support section 20*b* of the base frame 20. The first middle frame 33 and the second middle frame 34 are disposed in a range from a region where the first support section 20*a* and the second support section 20*b* intersect to the −Y direction end section 27 of the second support section 20*b*.

The main frame 35 is a flat-plate-shaped member extending along the XZ plane and has a shape elongated in the ±X direction. The main frame 35 is disposed in a range from the first side frame 31 to the second side frame 32, and is supported by the first side frame 31, the second side frame 32, the first middle frame 33, and the second middle frame 34. That is, the main frame 35 is supported by the base frame 20 via the first side frame 31, the second side frame 32, the first middle frame 33, and the second middle frame 34.

When the recording device 1 is assembled, other components constituting the recording device 1, that is, various structural components, mechanism components, electronic components, and the like, are arranged inside the above described frame structure and are supported by the frame structure. For example, the medium movement section 4 is disposed in the ±X direction on the second support section 20*b* of the base frame 20 between the first middle frame 33 and the second middle frame 34. The medium movement section 4 is disposed so as to protrude from the through hole 2*t* in the +Y direction and the −Y direction, and the through hole 2*t* includes part of the space sandwiched between the first middle frame 33 and the second middle frame 34. In addition, the recording section 10 is supported by the main frame 35, and the carriage 12 moves in the ±X direction along the main frame 35. In other words, the recording section 10 is supported by the first side frame 31, the second side frame 32, the first middle frame 33, and the second middle frame 34 via the main frame 35. Further, as shown in FIG. 4, the power supply box 15 is fixed to the first middle frame 33.

Figure 6:
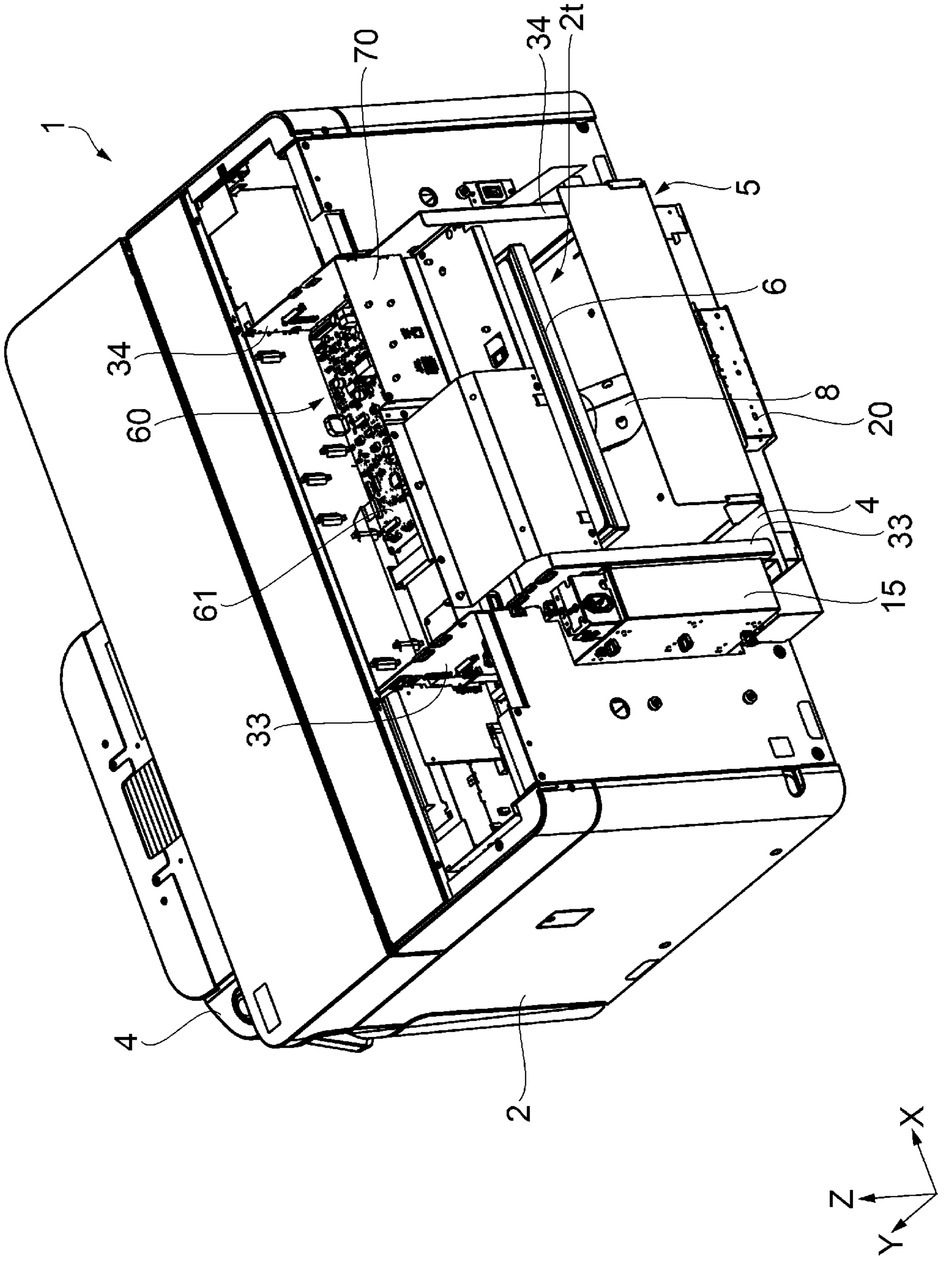
FIG. 6 is a perspective view showing the rear side of the recording device.

FIG. 6 is a perspective view showing the rear surface side of the recording device 1 and is a view showing a state where an upper surface panel 2*a* constituting the housing 2 is further removed from the state shown in FIG. 4.

As shown in FIG. 6, a control substrate 60 is disposed inside the housing 2. The control substrate 60 is a circuit substrate including a wiring substrate 61 and various circuit components mounted on the wiring substrate 61. The control substrate 60 controls the operation of the device main body including the recording section 10. That is, the control substrate 60 is involved in the operation of the recording section 10.

The control substrate 60 is disposed between the first middle frame 33 and the second middle frame 34 in the ±X direction. Between the first middle frame 33 and the second middle frame 34, the control substrate 60 is covered with a metal partition 70 that separates three surfaces, that is, a front surface on the +Y direction, a rear surface on the −Y direction, and a bottom surface on the −Z direction. That is, inside the housing 2, the control substrate 60 is entirely covered by the partition 70, the first middle frame 33, the second middle frame 34, and the upper surface panel 2*a*. For this reason, the adhesion of mist, dust and the like floating around the recording device 1 to the control substrate 60 is suppressed. The partition 70, the first middle frame 33, the second middle frame 34, and the upper surface panel 2*a*, which cover the control substrate 60, correspond to a storage section.

Figure 7:
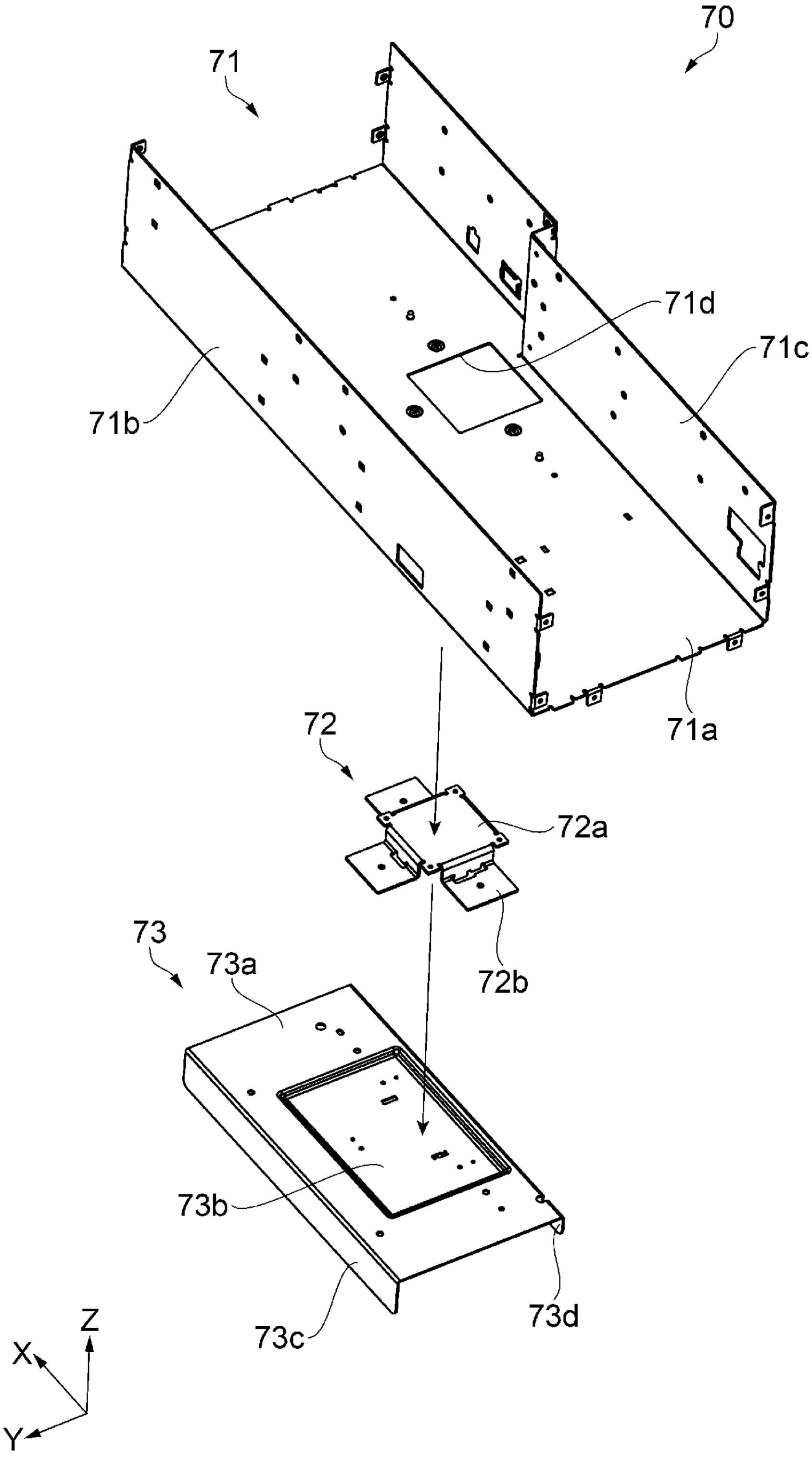
FIG. 7 is an exploded perspective view showing a partition.

FIG. 7 is an exploded perspective view showing the partition 70.

As shown in FIG. 7, the partition 70 includes a partition main body 71, a convex member 72, and a heat radiation member 73. The partition main body 71 is a substantially U-shaped member that opens in the +Z direction as viewed from the side in the ±X direction. The partition main body 71 is a member formed by bending a metal flat plate and includes a bottom surface section 71*a*, a front surface section 71*b*, and a rear surface section 71*c*. A bottom surface section 71*a* is a flat-plate-shaped section along the XY plane and covers the −Z direction of the control substrate 60. The front surface section 71*b* is formed by bending the +Y direction end section of the bottom surface section 71*a* in the +Z direction and covers the +Y direction of the control substrate 60. The rear surface section 71*c* is formed by bending the −Y direction end section of the bottom surface section 71*a* in the +Z direction and covers the −Y direction of the control substrate 60. A substantially rectangular through hole 71*d* is formed in the substantially center of the bottom surface section 71*a* of the partition main body 71. The partition main body 71 is formed of a steel plate similarly to each member constituting the frame.

The convex member 72 is a member formed by bending a metal flat plate and includes a protruding section 72*a* and three connecting sections 72*b*. The protruding section 72*a* is a flat-plate-shaped portion along the XY plane and has a substantially rectangular-shape as viewed from the ±Z direction. The three connecting sections 72*b* are positioned on a common virtual plane along the XY plane and are connected to the heat radiation member 73. The protruding section 72*a* is formed so as to protrude in the +Z direction more than the three connecting sections 72*b*. The convex member 72 is formed of, for example, an aluminum plate. The aluminum plate is a material having higher thermal conductivity than the steel plate, which is the material of the partition main body 71.

The heat radiation member 73 is a member formed by bending a metal flat plate and includes an upper surface section 73*a*, a first heat radiation section 73*c*, and a second heat radiation section 73*d*. The upper surface section 73*a* is a flat-plate-shaped section along the XY plane, and a recess section 73*b* recessed in the −Z direction is formed in the substantial center of the upper surface section 73*a* by stamping. A bottom surface of the recess section 73*b* is substantially flat, and the depth of the recess section 73*b* is slightly deeper than the thickness of the connecting section 72*b* of the convex member 72. The connecting section 72*b* of the convex member 72 is disposed on the bottom surface.

The first heat radiation section 73*c* and the second heat radiation section 73*d* are portions protruding in the −Z direction from the upper surface section 73*a*. Specifically, the first heat radiation section 73*c* is formed by bending the +Y direction end section of the upper surface section 73*a* in the −Z direction and the second heat radiation section 73*d* is formed by bending the −Y direction end section of the upper surface section 73*a* in the −Z direction. The first heat radiation section 73*c* and the second heat radiation section 73*d* correspond to a heat dissipation section. The heat radiation member 73 is formed of the same material as the convex member 72, that is, aluminum plate. The convex member 72 and the heat radiation member 73 formed by aluminum plate correspond to a heat transfer section. That is, the partition main body 71 formed of steel plate corresponds to a portion of the partition 70 other than the heat transfer section.

When assembling the partition 70, first, the convex member 72 is arranged in the recess section 73*b* of the heat radiation member 73 and the connecting section 72*b* is screwed to the recess section 73*b*. Next, the heat radiation member 73 is screwed to the bottom surface section 71*a* of the partition main body 71 so that the protruding section 72*a* of the convex member 72 protrudes in the +Z direction from the through hole 71*d* of the partition main body 71. As a result, the bottom surface section 71*a* of the partition main body 71 and the upper surface section 73*a* of the heat radiation member 73 are in contact with each other, thereby completing the partition 70.

Figure 8:
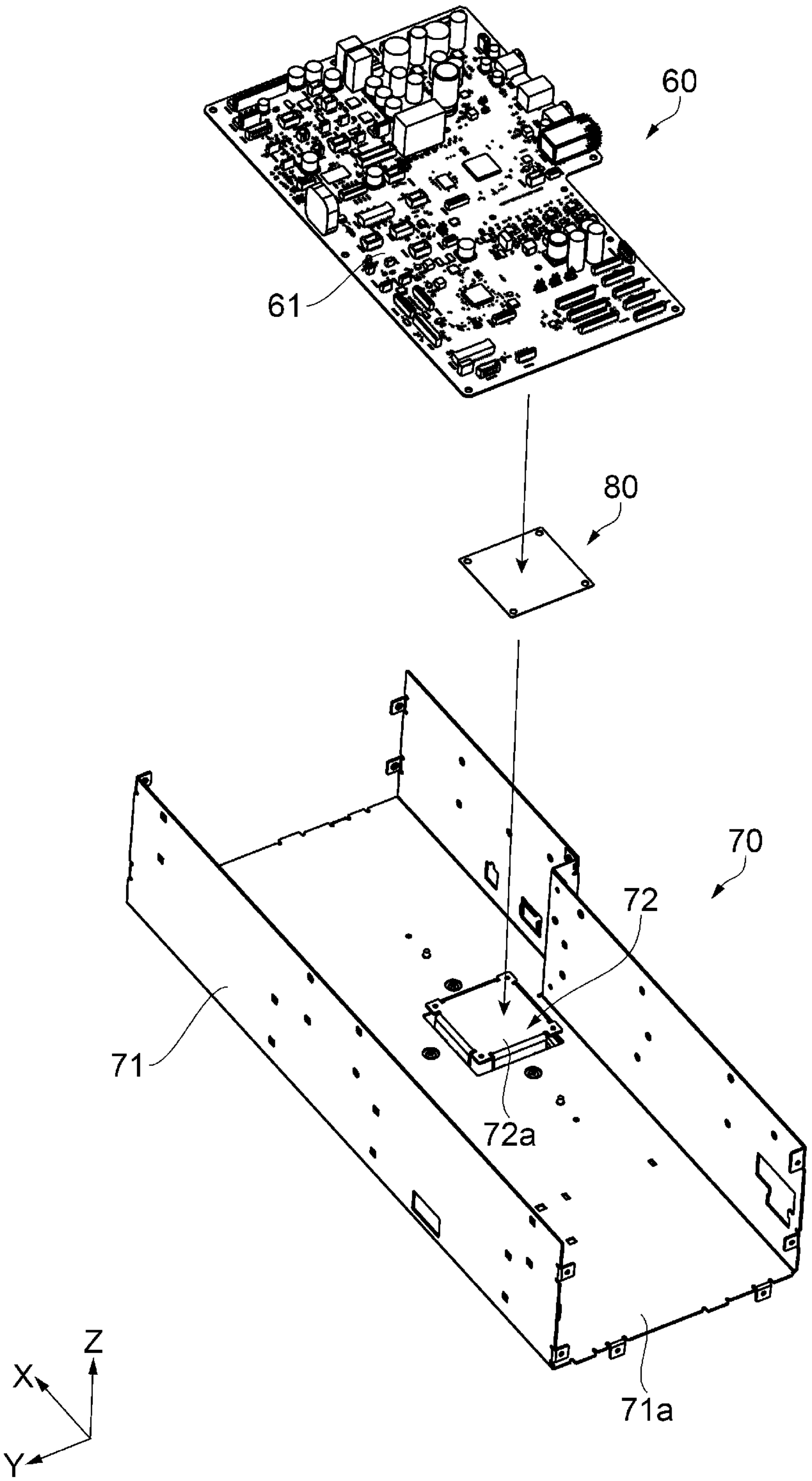
FIG. 8 is an exploded perspective view showing a control substrate and the partition.
Figure 9:
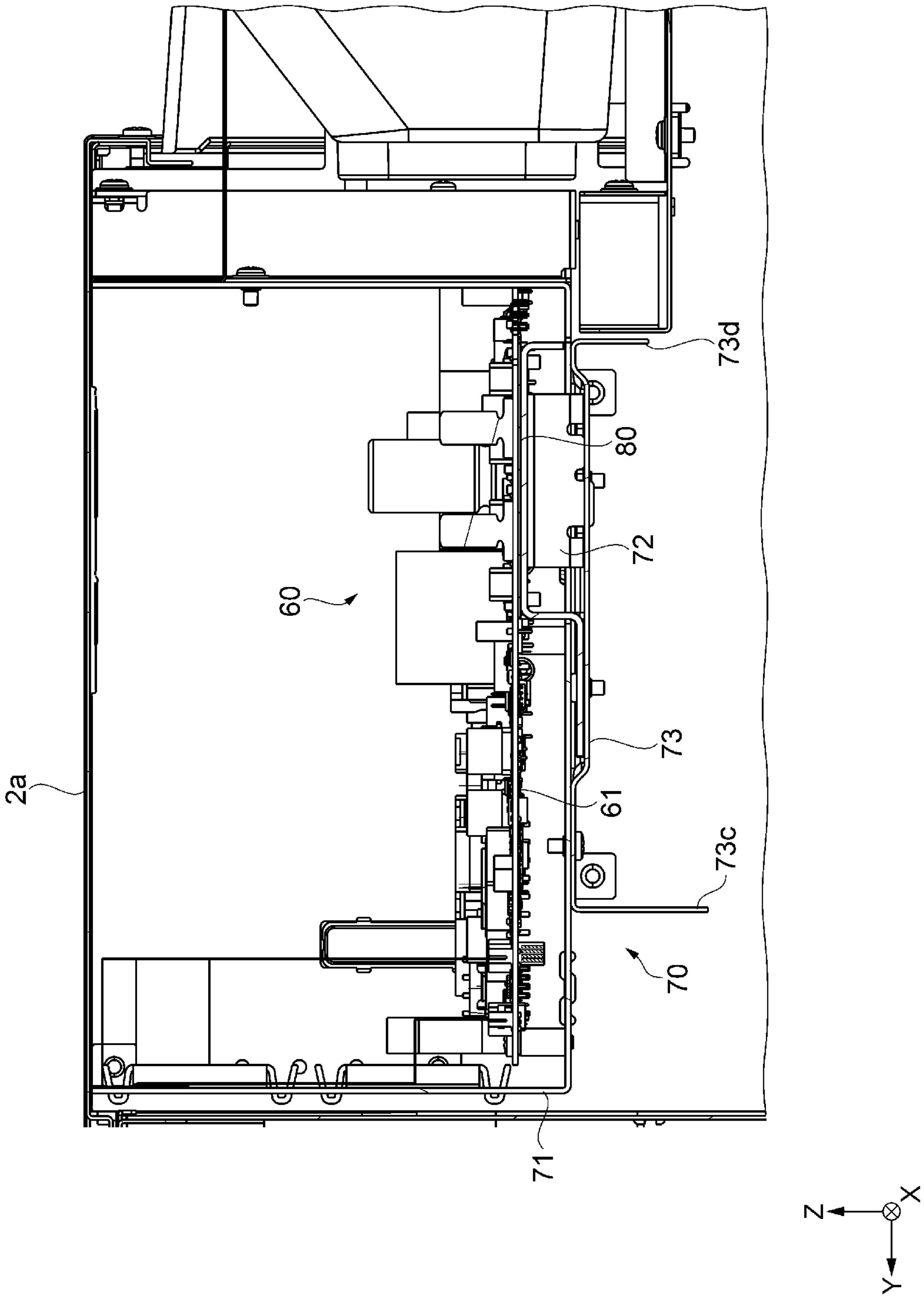
FIG. 9 is a cross-sectional view showing a state in which the control substrate is disposed in a housing.

FIG. 8 is an exploded perspective view showing the control substrate 60 and the partition 70, and FIG. 9 is a cross-sectional view showing a state where the control substrate 60 is disposed in the housing 2.

As shown in FIG. 8, the control substrate 60 is disposed on the bottom surface section 71*a* of the partition 70. At this time, a portion of the control substrate 60 that becomes particularly high temperature due to operation, that is, a high-temperature portion that needs to be cooled, is disposed to face the convex member 72. In other words, the position at which the convex member 72 is to be disposed is determined according to the position of the high-temperature portion to be cooled in the control substrate 60. Metal wiring is exposed, that is, without being covered with the solder resist or the like, at a portion of the −Z direction surface of the wiring substrate 61, which faces the convex member 72, that corresponds to the high-temperature portion, and heat is efficiently transferred to the convex member 72.

The control substrate 60 is disposed such that the high-temperature portion faces the protruding section 72*a* of the convex member 72 via a sheet-like elastic member 80 having heat conductivity, and is then fixed to the partition 70 by screwing. That is, the high-temperature portion of the control substrate 60 is in contact with the protruding section 72*a* of the convex member 72 via the elastic member 80. The elastic member 80 has high thermal conductivity and is excellent in its ability to follow irregularities, that is, in its ability for intimate contact. Therefore, hardly a gap is generated between the control substrate 60 and the protruding section 72*a*, and efficient heat transfer is possible. Further, the elastic member 80 is a member having an excellent electrical insulation property, and even when a plurality of wirings having different potentials are included in a high-temperature portion, the wirings are not short-circuited.

The elastic member 80 may be formed of, for example, silicone rubber. The elastic member 80 is not limited to a sheet-like member, and may be formed of, for example, a silicone gel or the like. The thermal conductivity of the elastic member 80 is higher than the thermal conductivity of air at least at normal temperature and normal humidity, and the dielectric breakdown voltage indicating the electrical insulation of the elastic member 80 is higher than the dielectric breakdown voltage of air at least at normal temperature and normal humidity. As the elastic member 80, Sarcon (R) manufactured by Fuji Polymer Industries Co., Ltd. is desirable.

The partition 70 to which the control substrate 60 is fixed is disposed between the first middle frame 33 and the second middle frame 34 inside the housing 2, and then the upper opening is closed by the upper surface panel 2*a* (see FIG. 9). As a result, the heat emitted from the high-temperature portion of the control substrate 60 is transferred to the convex member 72 via the elastic member 80 and further transferred to the heat radiation member 73 via the convex member 72. Then, heat of the heat radiation member 73 is transmitted to the partition main body 71, and is radiated from the first heat radiation section 73*c* and the second heat radiation section 73*d* to the lower space.

Figure 10:
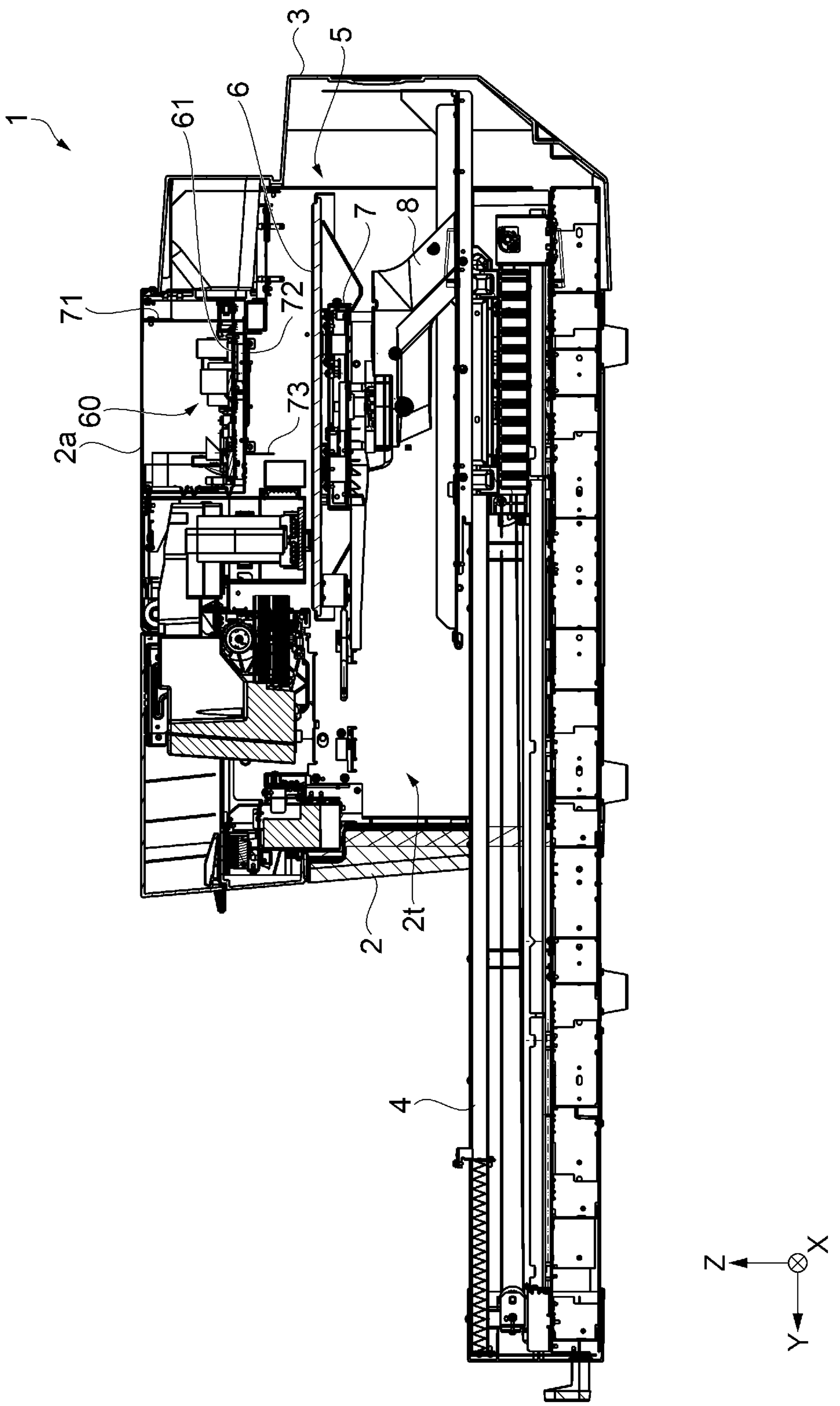
FIG. 10 is a cross-sectional view of the recording device as viewed from a −X direction.

FIG. 10 is a cross-sectional view of the recording device 1 as viewed from the −X direction.

As shown in FIG. 10, the control substrate 60 is disposed above the path along which the medium support section 5 moves in the ±Y direction. The heat radiation member 73 faces the space in which the medium support section 5 moves, and the first heat radiation section 73*c* and the second heat radiation section 73*d* of the heat radiation member 73 protrude toward this space. For this reason, heat generated from the heat radiation member 73 is radiated to the space in which the medium support section 5 moves, that is, to the space in the through hole 2*t*. Radiated heat is diffused along with the movement of the medium support section 5 and is discharged to the outside of the recording device 1 from the front of the through hole 2*t*. In addition, by moving the medium support section 5 between the inside and the outside of the housing 2, heat radiation to the outside is promoted and the air outside the recording device 1 is easily taken into the through hole 2*t*, and thus the control substrate 60 is efficiently cooled.

As described above, according to the recording device 1 of the present embodiment, the following effects can be obtained.

According to the present embodiment, since the control substrate 60 is in contact with the convex member 72 constituting the metal partition 70 via the elastic member 80 having heat conductivity, it is possible to effectively radiate the heat of the control substrate 60 to the partition 70. As a result, there is no need to provide a blower fan for cooling the control substrate 60. Further, since the entire control substrate 60 is covered with the partition 70, the first middle frame 33, the second middle frame 34, and the upper surface panel 2*a*, it is possible to suppress the influence of floating matter such as mist or fluff.

According to the present embodiment, since the heat of the control substrate 60 is radiated to the convex member 72, which amongst the partition 70, is a member formed of a material having high thermal conductivity, it is possible to effectively cool the control substrate 60.

According to the present embodiment, since the heat radiation member 73, which receives the heat of the control substrate 60 via the convex member 72, faces the space in which the medium support section 5 moves, the heat radiated from the heat radiation member 73 can be diffused along with the movement of the medium support section 5 and discharged to the outside of the housing 2.

According to the present embodiment, since the medium movement section 4 moves the medium support section 5 between the inside and the outside of the housing 2, the heat radiated from the heat radiation member 73 can be efficiently discharged to the outside of the housing 2 as the medium support section 5 moves, and relatively low-temperature air can be taken in from the outside of the housing 2.

According to the present embodiment, since the heat radiation member 73 includes the first heat radiation section 73*c* and the second heat radiation section 73*d*, which protrude into the space in which the medium support section 5 moves, it is possible to effectively radiate heat that is received by the heat radiation member 73.

The above embodiment may be modified as follows.

In the above described embodiment, a configuration in which the control substrate 60 is covered with the partition 70 is described, but the disclosure is not limited to this configuration. For example, a circuit substrate for a power supply or a circuit substrate for communication may be covered with the partition 70.

In the above embodiment, the heat transfer section is constituted by two members of the convex member 72 and the heat radiation member 73, but the heat transfer section may be constituted by a single member. In addition, the partition main body 71 may be formed of the same material as the convex member 72 and the heat radiation member 73, or the entire partition 70 may be formed of one member. In these cases, the entire partition 70 corresponds to the heat transfer section. That is, the heat transfer section may constitute at least a part of the partition 70.

In the above embodiment, the liquid discharged by the recording section 10 is not limited to ink. For example, the recording section 10 may discharge a liquid containing a material such as an electrode material or a coloring material used for manufacturing various displays in a dispersed or dissolved state.

In the above embodiment, the recording device 1 is a device for performing recording on a medium, and may be a serial printer, a lateral printer, a line printer, a page printer, or the like. In addition, the recording method is not limited to the inkjet method and may be a thermal method, a dot impact method, a laser method, or the like.

What is claimed is:

1. A recording device comprising:

a recording section configured to perform recording on a medium;

a circuit substrate configured to be involved in the operation of the recording section;

a storage section including a metal partition and covering the circuit substrate; and a movement section configured to move a medium support section that supports the medium, wherein the circuit substrate is in contact with a heat transfer section constituting at least a part of the partition via an elastic member having heat conductivity, and the heat transfer section faces a space in which the medium support section moves.

2. The recording device according to claim 1, wherein the heat transfer section is formed of a material having thermal conductivity higher than that of a portion of the partition other than the heat transfer section.

3. The recording device according to claim 1, further comprising:

a housing for housing a device main body including the recording section, wherein the movement section is configured to move the medium support section between the inside and the outside of the housing.

4. The recording device according to claim 1, wherein the heat transfer section has a heat radiation section protruding toward the space.

* * * * *